United States Patent
Turull et al.

(10) Patent No.: US 10,140,158 B2
(45) Date of Patent: Nov. 27, 2018

(54) METHODS AND MODULES RELATING TO ALLOCATION OF HOST MACHINES

(71) Applicant: TELEFONAKTIEBOLAGET L M ERICSSON (PUBL), Stockholm (SE)

(72) Inventors: Daniel Turull, Sundbyberg (SE); Vinay Yadhav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 14/915,983

(22) PCT Filed: Feb. 23, 2016

(86) PCT No.: PCT/SE2016/050133
§ 371 (c)(1),
(2) Date: Mar. 2, 2016

(87) PCT Pub. No.: WO2017/146618
PCT Pub. Date: Aug. 31, 2017

(65) Prior Publication Data
US 2018/0081729 A1    Mar. 22, 2018

(51) Int. Cl.
*G06F 9/46* (2006.01)
*G06F 9/50* (2006.01)

(52) U.S. Cl.
CPC ...... *G06F 9/5027* (2013.01); *G06F 2209/505* (2013.01); *G06F 2209/5011* (2013.01)

(58) Field of Classification Search
CPC ........... G06F 9/5027; G06F 2209/5011; G06F 2209/505
See application file for complete search history.

(56) References Cited

U.S. PATENT DOCUMENTS

| | | | |
|---|---|---|---|
| 7,149,863 B1 | 12/2006 | Chew et al. | |
| 7,313,795 B2 | 12/2007 | Chew et al. | |
| 2009/0248990 A1* | 10/2009 | Sprangle | G06F 9/30043 711/147 |
| 2010/0217949 A1 | 8/2010 | Schopp et al. | |
| 2014/0282504 A1* | 9/2014 | O'Donnell et al. | G06F 9/45558 718/1 |

* cited by examiner

*Primary Examiner* — Camquy Truong

(57) ABSTRACT

A method and a Host Machine Allocating Module (HMAM) for allocating a host machine. The HMAM is configured for managing information about latency ratings for pairs of groups comprising CPUs and memory units. Said each pair is associated with a respective latency rating. The HMAM receives a request for allocation, wherein the request indicates a first number of CPUs and a second number of memory units and a policy. The policy defines a distribution of the first number of CPUs and the second number of memory units with respect to sets of latency ratings. The HMAM distributes, based on the distribution, the first number of CPUs and the second number of memory units into clusters. The HMAM allocates said each cluster to at least one of said pairs of groups, wherein the respective latency rating of said at least one of said pairs is found to match, according to the policy, the respective one of the sets of latency ratings for said each cluster. A Latency Rating Information Generating Module and a method therein. Additionally, corresponding computer programs and carriers therefor.

14 Claims, 7 Drawing Sheets

| | Memory Unit Group | | | | | |
|---|---|---|---|---|---|---|
| | M1 | M2 | M3 | M4 | M5 | M6 |
| C1 | 3 | 4 | 5 | 4 | 5 | 6 |
| C2 | 2 | 3 | 4 | 3 | 4 | 5 |
| C3 | 1 | 2 | 3 | 2 | 3 | 4 |
| C4 | 4 | 5 | 6 | 3 | 4 | 5 |
| C5 | 3 | 4 | 5 | 2 | 3 | 4 |
| C6 | 2 | 3 | 4 | 1 | 2 | 3 |

(CPU Unit Groups)

METHODS AND MODULES RELATING TO ALLOCATION OF HOST MACHINES

This application is a 371 of International Application No. PCT/SE2016/050133, filed Feb. 23, 2016, the disclosure of which is fully incorporated herein by reference.

TECHNICAL FIELD

Embodiments herein relate to computer systems, such as so called cloud computing systems. In particular, a method and a Host Machine Allocating Module for allocating a host machine in a hardware system, such as the aforementioned cloud computing system as well as a method and a Latency Rating Information Generating module for generating information about latency rating for use in a hardware system, again such as the aforementioned cloud computing system, are disclosed. Corresponding computer programs and carriers therefor are also disclosed.

BACKGROUND

Computer systems are formed by hardware and software architectures. A hardware architecture deals with how different resources, such as processing power, memory, networking interface and the like, are interconnected with, e.g. in terms of physical formats, number of wires, each other. A software architecture deals with how different programs, such as operating systems, applications, applets, virtual machines and more, are executed on the hardware architecture.

A traditional hardware architecture, used for e.g. a Data Center, a cloud computing system, is typically built up a plurality of racks, such as cabinets, that are networked together. Each rack comprises one or more fully functional computers, e.g. embodied as one or more server blades. Hence, each server blade is self-contained with resources, such as processors, memory, storage, networking interface and Input/Output (I/O) peripherals. An issue with a server blade is its static nature with regard to composition of resources. This implies that once the server blade has been assembled, processing capacity, memory capacity, network interface capacity etc. cannot be upgraded without physical intervention with the server blade, e.g. memory capacity could be upgraded by manually inserting more memory into the server blade manually.

In order to solve this issue, and other issues, disaggregated hardware architectures have emerged. A disaggregated hardware architecture, such as Intel Rack Scale architecture and HyperScale Datacenter Systems, separates the resources—which with the traditional hardware architecture would have been confined within one blade—that make up a hardware machine, such a server. The separated resources are organized into pools. Then, a host machine is allocated by picking resources of from the pools. An exemplifying known disaggregated hardware system 1 is shown in FIG. 1. The known disaggregated hardware system 1 comprises an interconnect 2, such as a superfast optical fiber connectivity. The interconnect 2 interconnects a Central Processing Unit (CPU) pool 3, a memory pool 4 and a storage pool 5. The memory pool 4 may refer to short-term memories, such as cache memory or the like, whereas the storage pool 5 may refer to long-term storage, such as storage on hard drives, magnetic tape, etc. Here, long-term and short-term shall be considered in relation to each other. Typically, each pool comprises one blade. With this set up, e.g. the CPU pool 3 and the disk pool 5 will be available also during replacement of the memory pool. The CPU pool 3 comprises CPUs, the memory pool 4 comprises memory units, and the disk pool comprises disk units, all shown as rectangles in their respective pool. A Host Machine Manager 6 handles allocation of host machines. In this example, three host machines 10, 20 and 30 are illustrated in the Figure.

Since the resources of the disaggregated hardware system are clubbed into pools, access latency between resources in each pool is not uniform. For example, access latencies between a CPU in the CPU pool will not be uniform toward different memory units in a memory pool. Therefore, when the Host Machine Manager 6 has picked a first host machine 10 and a second host machine 30 as shown in FIG. 1, varying latencies of memory access for the CPUs of the first and second host machine 10, 30, can lead to that the two host machines 10, 30, which otherwise e.g. have identical numbers of CPUs and memory units, have different performance.

A problem is hence how to ensure predictable and/or desired performance of host machines in a disaggregated hardware system of the above mentioned kind.

Now returning to the traditional hardware architecture, in case of a Non-Uniform Memory Access (NUMA) architecture, a known server blade has a CPU which is connected to local memory units and remote memory units. Since latency for the CPU to access the local memory units is less that of accessing the remote memory units, memory is allocated to local memory units as far as possible. In this manner, performance is kept as high as possible.

SUMMARY

An object may be to improve performance of the aforementioned host machine.

According to an aspect, the object is achieved by a method, performed by a Host Machine Allocating Module, for allocating a host machine in a hardware system, wherein the hardware system comprises a memory pool, comprising memory units, and a CPU pool, comprising CPUs, wherein the Host Machine Allocating module is configured for managing information about latency ratings for pairs of groups comprising CPUs and memory units, wherein each pair comprises one group of CPUs and one group of memory units, wherein said each pair is associated with a respective latency rating among the latency ratings, wherein the respective latency rating indicates latency between said one group of CPUs and said one group of memory units of said each pair.

The Host Machine Allocating Module receives a request for allocation of the host machine, wherein the request indicates a first number of CPUs and a second number of memory units to be allocated for the host machine, wherein the request further indicates a policy for adapting the host machine for execution of a type of process, wherein the policy defines a distribution of the first number of CPUs and the second number of memory units with respect to sets of latency ratings related to the latency ratings of the information.

The Host Machine Allocating Module distributes, based on the distribution, the first number of CPUs and the second number of memory units into clusters of CPUs and memory units, wherein each cluster is associated with a respective one of the sets of latency ratings of the distribution.

Furthermore, the Host Machine Allocating Module allocates said each cluster to at least one of said pairs of groups, wherein the respective latency rating of said at least one of said pairs is found to match, according to the policy, the respective one of the sets of latency ratings for said each cluster.

According to another aspect, the object is achieved by a Host Machine Allocating Module configured for allocating a host machine in a hardware system, wherein the hardware system comprises a memory pool, comprising memory units, and a CPU pool, comprising CPUs, wherein the Host Machine Allocating Module is configured for managing information about latency ratings for pairs of groups comprising CPUs and memory units, wherein each pair comprises one group of CPUs and one group of memory units, wherein said each pair is associated with a respective latency rating among the latency ratings, wherein the respective latency rating indicates latency between said one group of CPUs and said one group of memory units of said each pair.

The Host Machine Allocating Module is configured for receiving a request for allocation of the host machine, wherein the request indicates a first number of CPUs and a second number of memory units to be allocated for the host machine, wherein the request further indicates a policy for adapting the host machine for execution of a type of process, wherein the policy defines a distribution of the first number of CPUs and the second number of memory units with respect to sets of latency ratings related to the latency ratings of the information.

The Host Machine Allocating Module is further configured for distributing, based on the distribution, the first number of CPUs and the second number of memory units into clusters of CPUs and memory units, wherein each cluster is associated with a respective one of the sets of latency ratings of the distribution.

Moreover, the Host Machine Allocating Module is configured for allocating said each cluster to at least one of said pairs of groups, wherein the respective latency rating of said at least one of said pairs is found to match, according to the policy, the respective one of the sets of latency ratings for said each cluster.

According to a further aspect, the object is achieved by a method, performed by a Latency Rating Information Generating module, for generating information about latency rating for use in a hardware system, wherein the hardware system comprises a memory pool, comprising memory units, and a CPU pool, comprising CPUs.

The Latency Rating Information Generating module estimates, for each CPU of the CPU pool, a first latency rating for said each CPU towards the memory pool.

The Latency Rating Information Generating module estimates, for each memory unit of the memory pool, a second latency rating for said each memory unit towards the CPU pool.

The Latency Rating Information Generating module organizes the CPUs into a first plurality of groups of CPUs based on the estimated first latency rating, wherein each CPU of each group of the first plurality of groups has a first common latency rating towards the memory pool.

The Latency Rating Information Generating module organizes the memory units into a second plurality of groups of memory units based on the estimated second latency rating, wherein each memory unit of each group of the second plurality of groups has a second common latency rating towards the CPU pool.

According to yet another aspect, the object is achieved by a Latency Rating Information Generating Module configured for generating information about latency rating for use in a hardware system, wherein the hardware system comprises a memory pool, comprising memory units, and a CPU pool, comprising CPUs.

The Latency Rating Information Generating Module is configured for estimating, for each CPU of the CPU pool, a first latency rating for said each CPU towards the memory pool.

The Latency Rating Information Generating Module is further configured for estimating, for each memory unit of the memory pool, a second latency rating for said each memory unit towards the CPU pool.

Moreover, the Latency Rating Information Generating Module is configured for organizing the CPUs into a first plurality of groups of CPUs based on the estimated first latency rating, wherein each CPU of each group of the first plurality of groups has a first common latency rating towards the memory pool.

Additionally, the Latency Rating Information Generating Module is configured for organizing the memory units into a second plurality of groups of memory units based on the estimated second latency rating, wherein each memory unit of each group of the second plurality of groups has a second common latency rating towards the CPU pool.

According to further aspects, the object is achieved by computer programs and carriers therefor corresponding to the aspects above.

Since the request indicates the policy, the Host Machine Allocating Module distributes, based on the distribution of the policy, the first number of CPUs and the second number of memory units into the clusters of CPUs and memory units. In this manner, it is ensured that a certain average latency will be achieved, because each cluster of the clusters is related to one or more latency ratings of the information.

Next, the Host Machine Allocating Module allocates said each cluster to said at least one of said pairs of groups for which the respective latency rating is found to match, according to the policy, said one or more latency ratings of the information.

Accordingly, the Host Machine Allocating Module considers latency ratings for CPU and memory units when allocating the host machine, e.g. the CPUs and memory units for the host machine to be allocated.

An advantage is hence that predictable and uniform performance of the host machine is achieved. The performance, e.g. in terms of latency, is said to be predictable, since the performance is related to the policy given in the request. The performance is said to be uniform, since two host machines with the same policy will obtain the same, or almost the same, performance. Furthermore, the performance is said to be uniform, since when a host machine is allocated at two different time instances, the performance for the host machine becomes the same, or almost the same.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
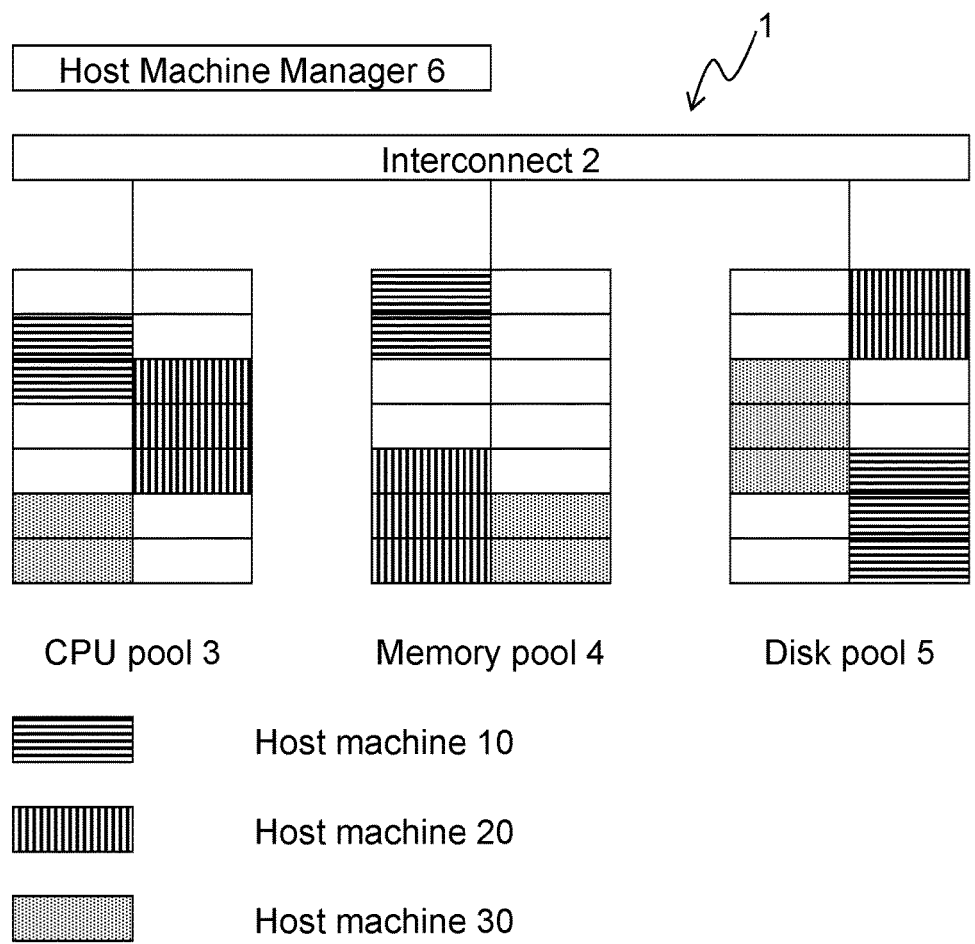
FIG. 1 is a schematic block diagram of a known disaggregated hardware system.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 2:
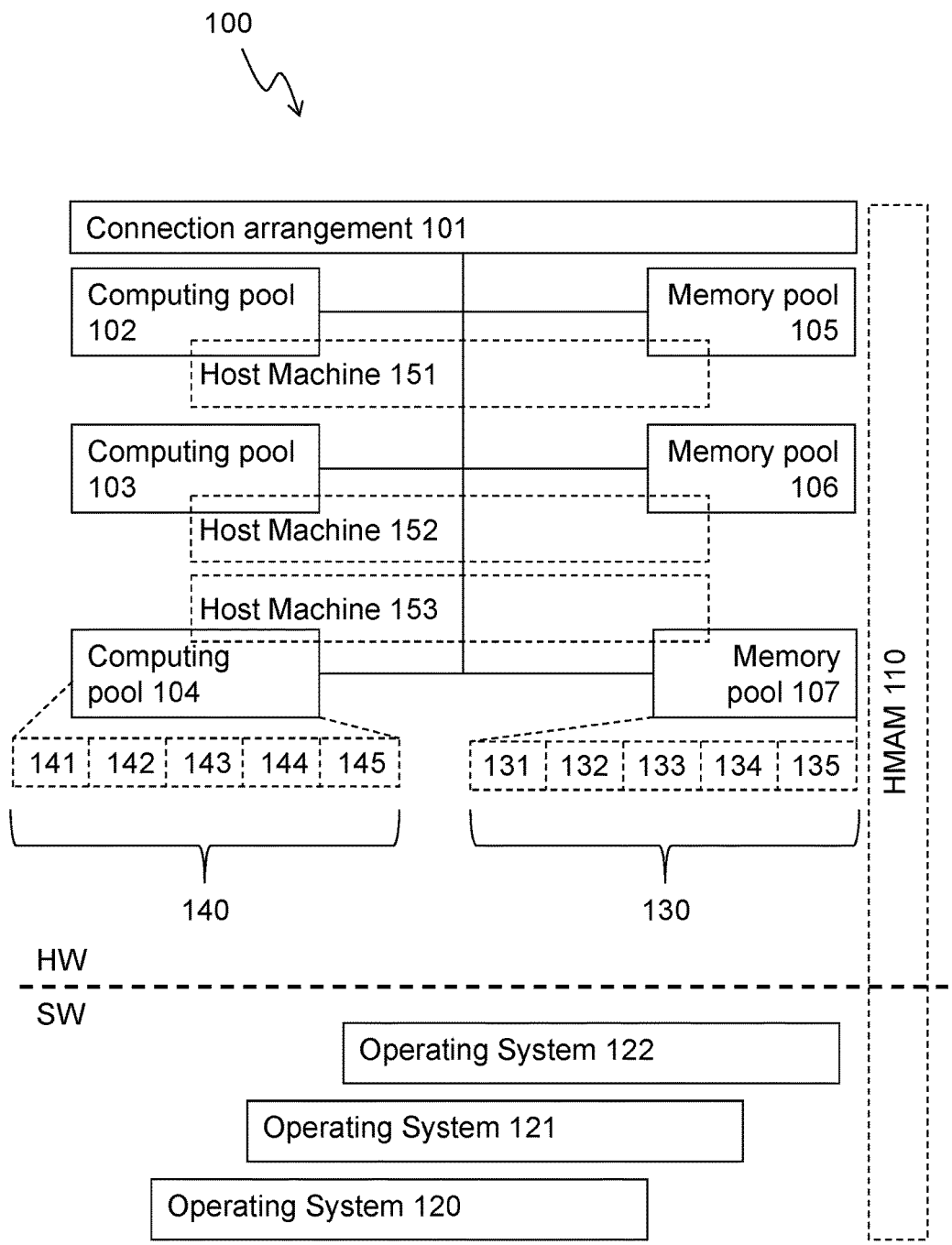
FIG. 2 is a schematic block diagram of an exemplifying hardware system in which embodiments herein may be implemented.

FIG. 2 depicts an exemplifying hardware system 100 in which embodiments herein may be implemented. The hardware system 100 may be a disaggregated hardware system as disclosed in the background section.

Generally, the hardware system 100 relies on a principle of hardware resource disaggregation. The principle of hardware disaggregation considers CPU, memory and network resources as individual and modular components. The resources are often organized in pools, such as blades, sleds etc. That is, there is a pool of CPU units and a pool of memory units. The resources may comprise many other different kinds of pools, such as storage pools, pools of network interfaces, etc., but throughout this disclosure pools of CPUs and memory units are discussed for reasons of relevance. The terms "CPU pool", "memory pool" etc. will be used herein to refer to a pool of CPUs and a pool of memory units. When utilizing the hardware system, a host machine may be composed of a sub-set of units/resources within one or more pools. In some examples, a Host Machine Allocating Module (HMAM) 110 assembles a host machine 151, 152, 153 by selecting a sub-set of resources within one or more pools. In this manner, a number of resources is allocated to the host machine 151, 152, 153. In related literature, the host machine may be referred to by the terms "logical hardware machine" and "virtual hardware machine".

In more detail, the hardware system 100 may comprise a connection arrangement 101 for interconnecting a set of CPU pools 102, 103, 104 with a set of memory pools 105, 106, 107. The connection arrangement 101 may be realized by optical fibers. Thus, a fast interconnection, as an example of the connection arrangement 101, between the sets of computing and memory pools 102-107 is provided.

Each memory pool of the set of memory pools 105, 106, 107 may be comprised in a rack of memory pools or the like. A rack refers to a closet, a cabinet or the like for housing some or all of the sets of computing and memory pools 102-107.

Moreover, the set of memory blades 105, 106, 107 may comprise one or more of:

a set of primary storage pools for use by the set of CPU pools, a set of cache memory blades for use by the set of CPU pools, and the like.

The set of primary storage pools may be realized in the form of so called cache memory(ies) and/or Random Access Memory(ies). The storage pools may include hard disc drives of various kinds, such as Solid State Drives, magnetic tape, conventional drives of various form factors (inches) and interfaces, such as Small Computer System Interface (SCSI), Integrated Drive Electronics/AT Attachment (IDE/ATA), Serial ATA (SATA), etc.

Each CPU pool, or computing pool, comprises computing units 141, 142, 143, 144, 145. The CPU pools 102, 103, 104 may be realized in the form of one or more sleds, blades or assemblies of one or more computer racks (not shown). The computing units 141, 142, 143, 144, 145 may comprise CPUs, Graphics Processing Units (GPUs), hardware implemented computing functions, etc. At least some CPU pools 102, 103, 104 may lack at least one cache level, which in conventional computer systems typically is co-located i.e. placed on a Printed Circuit Board (PCB) together with the CPU(s). Cache levels are typically known as L1, L2 or L3 caches in the related literature. In some examples though, e.g. due to latency requirements, each CPU pool may include any number of cache levels, which may or may not be backed up by, i.e. supported by, one or more further levels of cache memory comprised in the set of memory blades 105, 106, 107 as mentioned above. In further examples, some CPU pools 102, 103, 104 may comprise a first level of primary storage pools and a second level of primary storage pools may be comprised in the set of memory blades, where latency of the first level of primary pools typically is less than latency of the second level of primary pools. Thus, primary storage for the hardware system, taken as a whole, is organized in a hierarchical manner spanning over both computing and memory blades. Generally, the hardware system may comprise CPU pools and memory blades, wherein the memory blades comprises at least some primary memory, e.g. the second level of primary storage pools, used by the set of CPU pools.

Each memory blade comprises memory units 131, 132, 133, 134, 135. The memory blades 105, 106, 107 may be realized in the form of one or more sleds, blades or assemblies of one or more computer racks, the same, different or partially the same one(s) as compared the above mentioned racks for the CPU pools. Each memory blade may preferably lack any substantial processing capabilities. Such substantial processing capabilities, or computing resources, is thus provided by means of the CPU pools 102, 103, 104.

In more detail, the memory units may be arranged on a memory board, as an example of memory blade, and the computing units 140 are arranged on a computing board, as an example of CPU pool and/or computing blade. The memory board is different from the computing blade. This may mean that the memory blade is a Printed Circuit Board (PCB) that is separate from a further PCB at which the computing units may be mounted.

The memory board and the computing board are connected to the connection arrangement 101 to interconnect the set of memory blades 105, 106, 107 and the set of CPU pools 102, 103, 104. The set of memory blades 105, 106, 107 are mountable, such as installable, in a first plurality of cabinets, while still being connected to the connection arrangement. The set of CPU pools 102, 103, 104 are mountable in a second plurality of cabinets, wherein some, none or all of the cabinets of the first and second plurality of cabinets are different from each other. This means that in one exemplifying realization, there is provided at least one memory cabinet, comprising memory blades, and at least one computing cabinet, comprising CPU pools. In another realization, there may be one or more cabinets, wherein at least some of said one or more cabinets comprises both memory blades and CPU pools, and/or wherein at least some of said one or more cabinets comprises either memory blades or CPU pools.

At the software side (SVV), as opposed to the hardware (HW) side described above, one or more operating systems 120, 121, 122 may be executed on a respective logical hardware machine. This means that the computer system 100 hosts one or more operating systems 120, 121, 122. It shall here be said that a line between HW and SW is often somewhat fuzzy, since various programming languages enable implementation of a module both as hardware and software, also a Field Programmable Gate Array (FPGA) can be seen as a half-SW and half-HW component. As indicated above, the respective logical hardware machine may comprise a selected set of CPU pools and a selected set of memory blades. The operating systems 120, 121, 122 may be referred to as virtual hosts, instances or the like, when executed by the computer system 100. Each operating system 120, 121, 122 may in its turn manage one or more instances of a software application, a virtual machine, database, a software library or the like. Accordingly, as used herein, the term "instance" may refer to an instance of a virtual host, an operating system, a software application, a virtual machine, a database, a software library or the like.

Figures 3, 4:
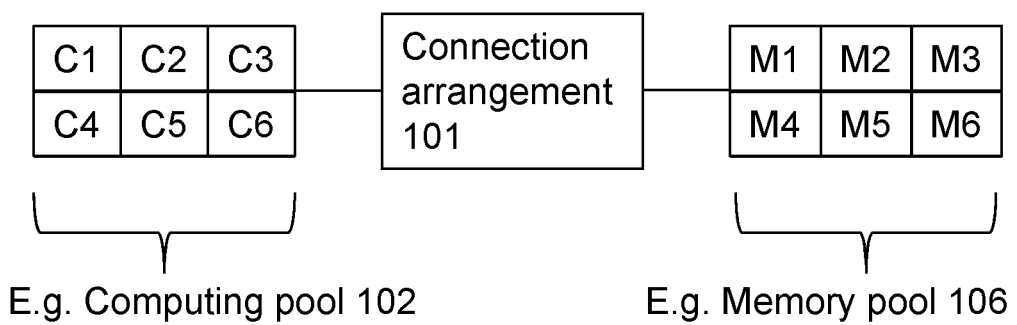
FIG. 3 is a detailed block diagram of a portion of the exemplifying hardware system of FIG. 2.
FIG. 4 is an example of information about latency ratings.

Now turning to FIG. 3, a more detailed view of a first CPU pool 102, i.e. one of the CPU pools shown in FIG. 2, and a first memory pool 106, i.e. one of the CPU pools shown in FIG. 2, is shown.

In line with the above, the first CPU pool 102, 103, 104 comprises CPUs and the memory pool 106 comprises memory units. In FIG. 3, groups of CPUs C1-C6 comprise one or more CPUs, preferably a plurality of CPUs. Similarly, groups of memory units M1-M6 comprise one or more memory units, preferably a plurality of memory units. This means that each of the boxes C1-C6, M1-M6 illustrates a group of CPUs or memory units. An exact or minimum amount for the plurality of CPUs/memory units may depend on the application. As an example, the minimum amount may be 3, 10, 50, 100, 120, 400, etc. or the like.

FIG. 3 illustrates that e.g. a first latency for a first pair of groups, e.g. comprising a first group of CPUs C1 and a first group of memory units M6 is different from a second latency for a second pair of groups, e.g. comprising a second group of CPUs C3 and a second group of memory units M4. As an example, the first latency may be 32 nanoseconds (ns) and the second latency may be 7 ns. The first and second latencies may be classified into latency ratings as elaborated below.

FIG. 4 illustrates an example of information about latency ratings for each possible pair of CPU/memory groups. The information about latency ratings may be organized in a table, i.e. a Latency Rating Table (LRT). In other examples, the information about latency rating may be organized in any other appropriate manner, such as an indexed listed, matrix or the like. Said each pair comprises one group C1-C6 of CPUs and one group M1-M6 of memory units. Said each pair is associated with a respective latency rating among the latency ratings.

In more detail, latency ratings may be mapped to a range in nanoseconds (ns) for some measured/estimated latency in the following manner:

1—5 ns,
2—5-10 ns,
3—10-15 ns,
4—15-20 ns,
5—20-30 ns, and
6—>30 ns.

The above ranges are merely provided as an example. Therefore, the ranges be different from the above in other examples. Estimation of latencies may be done based on in advance known distance between CPU-memory unit or it may be done by calculation/measurement of latencies when a new CPU or memory unit is added to a CPU/memory unit pool.

The respective latency rating indicates latency between said one group C1-C6 of CPUs and said one group M1-M6 of memory units of said each pair.

Returning to FIG. 2, it shall be noted that the Host Machine Allocating module 110 is configured for managing the information about latency ratings for the pairs of groups C1-C6, M1-M6 comprising CPUs and memory units.

From the table, it may e.g. be seen that for different pairs, the latency rating may increase with distance between the groups forming the pair. In addition or alternatively, it may be that quality, load (of connection between groups) and more, of a connection between the groups affects the latency rating. In the table, access latencies between CPUs and memory units are quantified.

Further elaborating on the groups of CPUs, now expressed somewhat differently from the above, the CPUs may be said to be organized into a first plurality of groups of CPUs, the first plurality of groups being referred to as "first groups". Each CPU of each first group has a first common latency rating towards the connection arrangement 101, or a particular group of memory units.

Similarly, the memory units may be said to be organized into a second plurality of groups of memory units, the second plurality of groups being referred to as "second groups". Each memory unit of each second group has a second common latency rating towards the connection arrangement 101, or a particular group of CPUs.

Again, but now in the context of the first and second groups, the Host Machine Allocating module 110 is configured for managing information about latency ratings for pairs, each pair comprising one first group and one second group, wherein the information associates said each pair with a respective latency rating among the latency ratings.

Before proceeding with a more detailed description of the embodiments herein, some features are briefly discussed.

According to some embodiments herein, memory units are associated, in a hierarchical manner, with the CPUs such that a host machine is allocated, or composed, from the hardware system, i.e. the CPUs and memory units thereof, with predictable latency, or access delay.

Thanks to that CPUs and memory units are allocated from different pairs of groups, the respective latency for each pair will be different, i.e. some will achieve high latency while others will achieve low latency. But for the host machine, when considered as an entity, an average latency will fall predictably within a narrow range, such as the above listed ranges for the latency ratings.

It may here be noted that latency, access latency, latency rating and the like relates to a duration of time from when a request for access to a memory is sent to contents of the requested memory is available for processing by a CPU.

Figure 5:
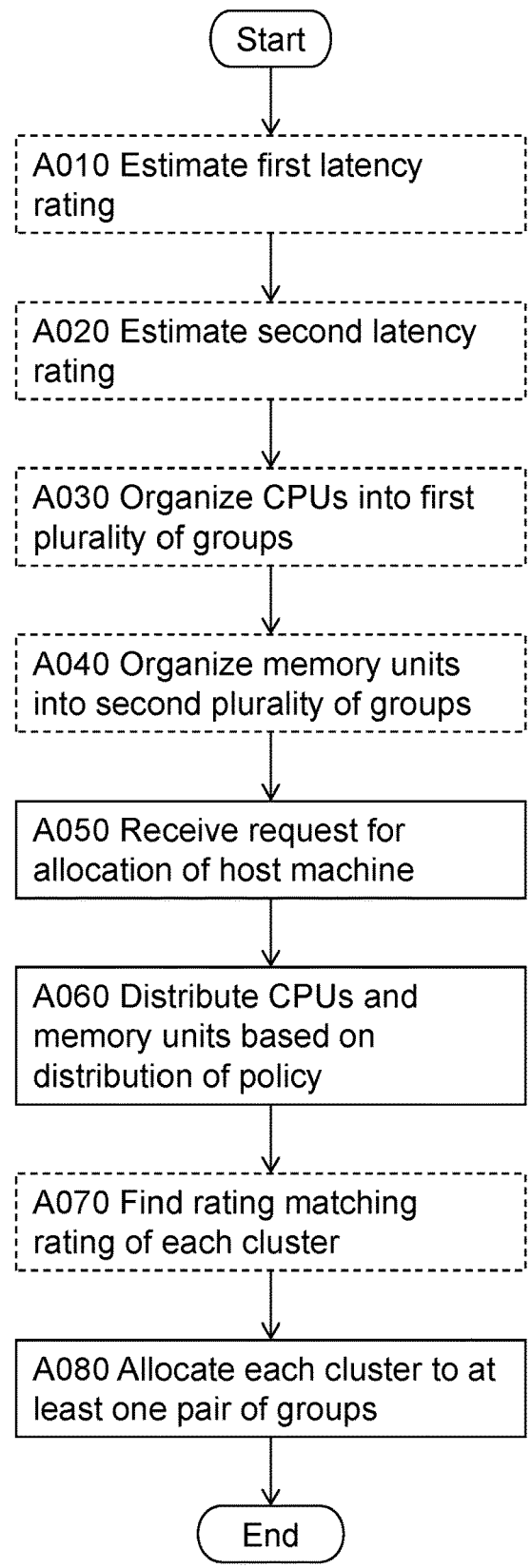
FIG. 5 is a flowchart illustrating embodiments of the method in the Host Machine Allocating Module.

FIG. 5 illustrates an exemplifying method according to embodiments herein when implemented in the hardware system 100 of FIG. 2. The Host Machine Allocating Module 110 performs a method for allocating a host machine 151, 152, 153 in the hardware system 100

As mentioned, the hardware system 100 comprises a memory pool 105, 106, 107, comprising memory units, and a CPU pool 102, 103, 104, comprising CPUs. Furthermore, the Host Machine Allocating module 110 is configured for managing information about latency ratings for pairs of groups C1-C6, M1-M6 comprising CPUs and memory units, wherein each pair comprises one group C1-C6 of CPUs and one group M1-M6 of memory units, wherein said each pair is associated with a respective latency rating among the latency ratings, wherein the respective latency rating indicates latency between said one group C1-C6 of CPUs and said one group M1-M6 of memory units of said each pair.

One or more of the following actions may be performed in any suitable order.

In order for the Host Machine Allocating Module 110 to be able to manage information about latency ratings, the information about latency ratings may be created, and e.g. organized into a table, such as a Latency Rating Table (LRT). This is described by actions A010 to A040.

Action A010

The Host Machine Allocating Module 110 may estimate, for each CPU of the CPU pool 102, 103, 104, a first latency rating for said each CPU towards the memory pool 105, 106, 107. In more detail, the Host Machine Allocating Module 110 may estimate a respective first latency rating for said each CPU towards the memory pool 105, 106, 107. As an example, the first latency rating towards the memory pool 105, 106, 107 may be estimated as latency, e.g. in ns, towards the connection arrangement 101, a particular group of memory units within the memory pool 105, 106, 107, or the like, for which a comparable latency may be achieved. Next, the latencies in terms of ns may be classified into latency ratings using e.g. the ranges mentioned above.

Action A020

The Host Machine Allocating Module 110 may estimate, for each memory unit of the memory pool 105, 106, 107, a second latency rating for said each memory unit towards, i.e. with respect to, the CPU pool 102, 103, 104. In more detail, the Host Machine Allocating Module 110 may estimate a respective second latency rating for said each memory unit with respect to the CPU pool 102, 103, 104. As an example, the second latency rating towards the CPU pool 102, 103, 104 may be estimated as latency, e.g. in ns, with respect to the connection arrangement 101, a particular group of CPUs within the CPU pool 102, 103, 104, or the like, for which a comparable latency may be achieved. Next, the latencies in terms of ns may be classified into latency ratings using e.g. the ranges mentioned above. This action may be performed before action A010.

Action A030

The Host Machine Allocating Module 110 may organize the CPUs into the first plurality of groups C1-C6 of CPUs based on the estimated first latency rating, wherein each CPU of each group of the first plurality of groups may have a first common latency rating towards the memory pool 105, 106, 107, i.e. the connection arrangement 101, a particular memory pool or the like as above. The first common latency rating may be 3 for a group of CPUs, denoted C1, towards a group of memory units, denoted M1.

Action A040

The Host Machine Allocating Module 110 may organize the memory units into the second plurality of groups M1-M6 of memory units based on the estimated second latency rating, wherein each memory unit of each group of the second plurality of groups may have a second common latency rating towards the CPU pool 102, 103, 104, i.e. the connection arrangement 101, a particular memory pool or the like as above.

With actions A010 to A040, CPUs and memory units that perform similar, e.g. with respect to access latency, are gathered into different groups. Then, the information about latency comprises the latency ratings and pairs of CPU/memory groups associated therewith.

Action A050

The Host Machine Allocating Module 110 receives a request for allocation of the host machine 151, 152, 153. The request may be received, or obtained, in response to that the host machine 151, 152, 153 is needed to execute a service at the hardware system 100. The service may e.g. be a web-shop, a cloud storage service or the like. The request may be received from a so called Equipment Managing Module (EMM) or the like. The EMM, sometimes referred to as instance manager, handles starting and stopping of services, placement and scheduling of services, discovery of resources, and the like. The EMM may or may not comprise the Host Machine Allocating Module 110.

The request indicates a first number of CPUs and a second number of memory units to be allocated for the host machine 151, 152, 153, wherein the request further indicates a policy for adapting the host machine 151, 152, 153 for execution of a type of process. The adapting of the host machine 151, 152, 153 may refer to how the first number of CPUs and the second number of memory units may be allocated to be adapted for execution of a type of process executable by the host machine. The type of process may be default/standard intensity process, memory intensive process, processing intensive process, networking intensive process or the like. Thanks to the policy, various host machines may be allocated while being adapted to different workloads, such as given by the type of process.

The policy defines a distribution of the first number of CPUs and the second number of memory units with respect to sets of latency ratings related to the latency ratings of the information. It shall here be noted that the term "sets of latency ratings" is distinguished from the term "latency ratings" in that the set of latency ratings is related to the distribution whereas the latency ratings is related to the information.

The distribution thus indicates e.g. how many low latency CPU/memory groups to be allocated, how many high latency CPU/memory groups to be allocated etc. High and low latency groups may be given in terms of the latency ratings, or nanoseconds translated to latency ratings.

In a first typical case, a range of latency ratings may be defined for each pair comprising one group C1-C6 of CPUs and one group M1-M6 of memory units. Hence, each set of the sets of latency ratings may correspond to at least two consecutive latency ratings of the latency ratings of the information.

Alternatively, in a second case, while not allowing for flexibility within the policy, each set of the sets of latency ratings may correspond to only one of the latency ratings of the information. The first typical case, allows for flexibility within the policy since two or more latency ratings corresponds to said each set of the latency ratings of the information.

Action A060

The Host Machine Allocating Module 110 distributes, based on the distribution, the first number of CPUs and the second number of memory units into clusters of CPUs and memory units. In this manner, the allocation of the host machine to be performed in action A080, is adapted according to the policy.

Each cluster is associated with a respective one of the sets of latency ratings of the distribution. Accordingly, each cluster may be associated with at least two consecutive latency ratings, as in the first typical case of action A050, or each cluster may be associated with only one of the latency ratings of the information, as in the second case of action A050.

Thanks to that the first number of CPUs and the second number of memory units are distributed over the clusters, associated with latency ratings, an individual latency rating for a certain allocation some more or less randomly selected CPUs and memory units may not impact latency of the host machine according to the request.

Action A070

The Host Machine Allocating Module 110 may find the respective latency rating of said at least one of said pairs that matches, according to the policy, the respective one of the sets of latency ratings for, i.e. associated with, said each cluster. In this manner, the policy determines which pairs of groups of CPUs and memory units that may be allocated in action A080.

The respective latency rating of said at least one of said pairs may match the respective one of the sets of latency ratings when the respective latency rating of said at least one of said pairs fulfills, e.g. the latency rating is less than or equal to, the latency rating associated with said each cluster.

Action A080

The Host Machine Allocating Module 110 allocates said each cluster to at least one of said pairs of groups C1-C6, M1-M6, wherein the respective latency rating of said at least one of said pairs is found to match, according to the policy, the respective one of the sets of latency ratings for said each cluster.

In this manner, it is ensured that host machines allocated from the hardware system 100 obtain predictable latency in that a first host machine, composed of the first number of CPUs and the second number of memory units, and a second host machine, also composed of the first number of CPUs and the second number of memory units—same to the number only, not the actual CPUs and memory units, obtains a same, or nearly the same, latency for memory access.

Notably, the information about latency ratings provides knowledge about latencies for CPU/memory pairs. In particular, there will be different latencies towards different groups of memory units e.g. with respect a certain CPU group. In this action, the information about latency ratings is used in the hardware system to allocate CPUs and memory units to a host machine in weighted manner, i.e. according to the distribution, to ensure near uniform performance of the host machine thus allocated.

Moreover, the host machine is adapted to e.g. what type of processes to be executed on the host machine, since the policy determines the distribution of the first number of CPUs and the second number of memory units among the pairs of CPU/memory groups.

In some embodiments, the allocation of said each cluster is performed under a constraint that CPUs and memory units for the cluster are only allocated from CPUs and memory units of said at least one of said pairs which are not previously allocated to a further host machine, i.e. another host machine than the host machine indicated, or defined, by the request.

As an example, it is assumed that two pairs match a desired latency rating. Then, it is further assumed that all CPUs, i.e. all CPUs of a certain cluster, can fit within a first pair of the pairs, but not all of the memory units can fit within the first pair. Then, a number of memory units which in fact can be fitted within the first pair determines how many of the CPUs that should be fitted within the first pair.

A reason for this is that within each pair it is assumed that there shall be a certain relation between the number of CPUs and memory units as given by the first number of CPUs and the second number of memory units. Then, a second pair may also need to be tested to determine whether or not the second pair may fit all of the remaining CPUs and memory units. Algorithms like bin-packing or similar known algorithms may be used to efficiently populate, or allocate, the clusters into the matching pairs.

In some examples, the actions A010, A020, A030 and A040 may be performed independently of one or more, or even all, of actions A050 to A080.

Figure 6:
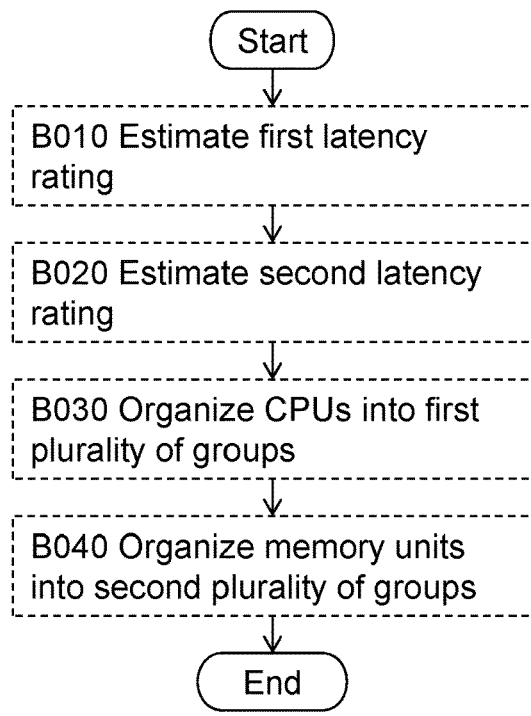
FIG. 6 is a flowchart illustrating embodiments of the method in the Latency Rating Information Generating Module.

Therefore, FIG. 6 illustrates a method, performed by a Latency Rating Information Generating module 120, for generating information about latency rating for use in a hardware system 100.

As mentioned above, the hardware system 100 comprises a memory pool 105, 106, 107, comprising memory units, and a CPU pool 102, 103, 104, comprising CPUs. With this method the information about latency ratings, such as the LRT, may be created. The Latency Rating Information Generating module 120 may be comprised in the Host Machine Allocating Module 110.

One or more of the following actions may be performed in any suitable order.

Action B010

The Latency Rating Information Generating module 120 estimates, for each CPU of the CPU pool 102, 103, 104, a first latency rating for said each CPU towards the memory pool 105, 106, 107. This action is similar to action A010.

Action B020

The Latency Rating Information Generating module 120 estimates, for each memory unit of the memory pool 105, 106, 107, a second latency rating for said each memory unit towards the CPU pool 102, 103, 104. This action is similar to action A020.

Action B030

The Latency Rating Information Generating module 120 organizes the CPUs into the first plurality of groups C1-C6 of CPUs based on the estimated first latency rating, wherein each CPU of each group of the first plurality of groups has a first common latency rating towards the memory pool 105, 106, 107. This action is similar to action A030.

Action B040

The Latency Rating Information Generating module 120 organizes the memory units into the second plurality of groups M1-M6 of memory units based on the estimated second latency rating, wherein each memory unit of each group of the second plurality of groups has a second common latency rating towards the CPU pool 102, 103, 104. This action is similar to action A040.

Figure 7:
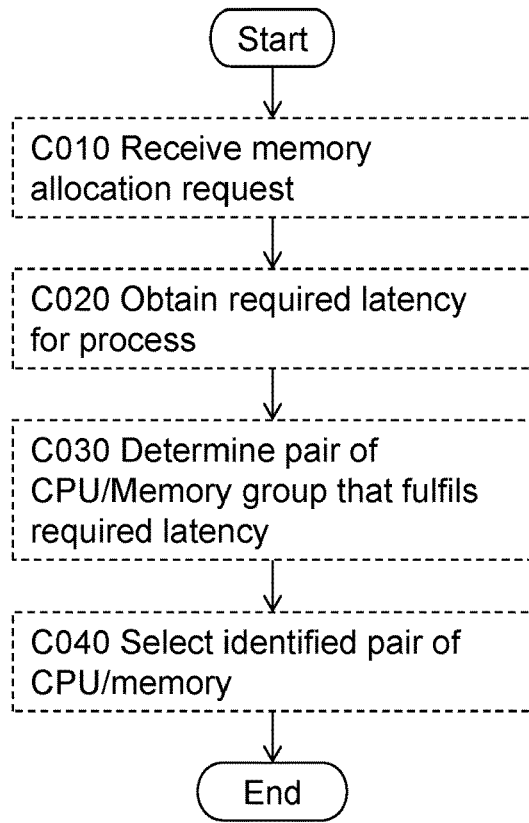
FIG. 7 is a flowchart illustrating an exemplifying method for scheduling of workload based on the information about latency ratings.

In FIG. 7, a schematic flowchart of exemplifying methods in a Memory Allocating Module 700 is shown. The Memory Allocating Module 700 is shown in more detail with reference to FIG. 10.

Accordingly, the Memory Allocating Module 700 performs a method for allocating memory for, e.g. to be used by, a process to be executed on a host machine. As an example, the allocation of memory for the process may be based on the aforementioned policy, which is coupled to the information about latency ratings and/or the distribution of CPUs/memory units. The allocation of memory may thus be based on the information about latency ratings.

The Memory Allocating Module 700 may co-operate with an operating system (not shown) run on the host machine. The operating system may comprise the Memory Allocating Module 700, or the Memory Allocating Module 700 may be separated from the operating system.

After resources, such as CPUs and memory units, have been allocated, i.e. resources have been assigned to a certain host machine, by the Host Machine Allocating Module, the host machine is started. This may mean that at least some portions of the operating system is loaded onto at least some of the allocated memory units and executed, e.g. by at least one of the allocated CPUs. The Memory Allocating Module 700 is responsible for decisions about on which CPU(s) and memory(/ies) of the host machine a process should be scheduled or executed. In order for the Memory Allocating Module 700 to make a proper decision, the information about latency ratings may be provided to the Memory Allocating Module 700.

The aforementioned EMM, or though hardware, may provide the information about latency ratings to the Memory Allocating Module 700, e.g. through what is often referred to as specific device information. The specific device information may be a portion of a specific memory dedicated for carrying information about a specific device, e.g. the hardware system 100.

Alternatively, or additionally, the information about latency ratings may be obtained by probing, e.g. performed by the Memory Allocating Module 700 or another module (not shown) cooperating with the Memory Allocating Module 700, during initialization of the host machine. During probing, the host machine executes a process in a certain CPU and calculates a latency associated with different memory units allocated to the host machine. In existing, NUMA memory units are considered in a binary manner, i.e. memory units are either local or remote. In contrast thereto, the memory units are, thanks to the probing, classified into different groups based on latency.

It may also be that the information about latency ratings is manually configured into the EMM.

One or more of the following actions may be performed in any suitable order.

Action C010

The Memory Allocating Module 700 receives a memory allocation request. The Memory Allocating Module 700 has access to the information about the latency ratings between CPUs and memory units of the host machine, i.e. those CPUs and memory units that the operating system manages. The information may have been obtained by inspecting the host machine, e.g. reading of ports of the host machine, reading of configuration parameters—similarly to specific device information, probing or the like.

Action C020

The Memory Allocating Module 700 may obtain a required latency, or required latency rating, for the process. A programmer, a system administrator, or the like may provide the required latency, e.g. if the programmer has provided the required latency it may be that the process upon initialization sends a required latency request to the operating system. The required latency request indicates the required latency to the operating system. If no required latency is obtained a default value for the required latency may be selected and used. As given by the information about latency ratings, the operating system may have varying latency rating towards different memory units.

Action C030

Once the required latency is obtained the Memory Allocating Module 700 may identify which pair of CPU/memory groups fulfills the required latency. Should no pair of CPU/memory group fulfill the required latency, the memory allocation request will be denied. This may happen when all pairs that fulfill the required latency already have been allocated to other processes managed by the operating system.

In this action, the Memory Allocating Module 700 may search for pairs of CPU/memory groups for which latency rating corresponds to the required latency or better. Better latency rating means less than, or shorter than, the required latency.

In some embodiments, the Memory Allocating Module 700 may handle, have access to, a table including pairs of CPU/memory groups and their associated latency rating. In this manner, identification of the pair fulfilling the required latency is made efficient in that the method of FIG. 7 may be performed during a deterministic and/or predictable time period.

Action C040

The Memory Allocating Module 700 may select, or allocate, the identified pair of CPU/memory group to the process causing the memory allocating request. Thus, the process is loaded into the CPU(s) and memory unit(s) of the identified pair of CPU/memory group.

Figure 8:
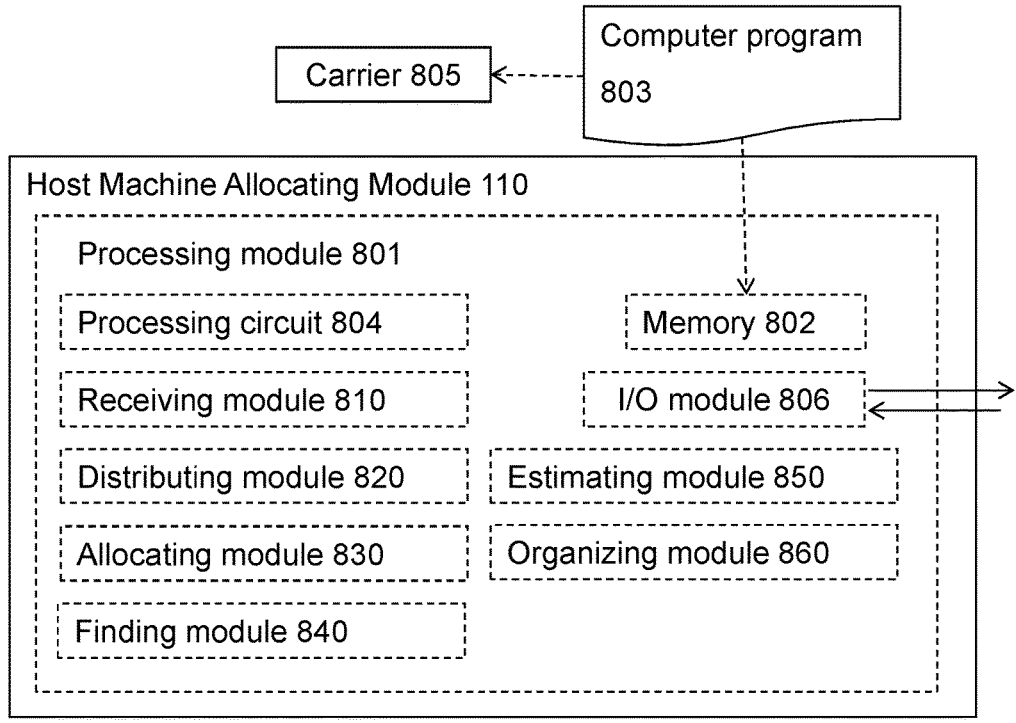
FIG. 8 is a block diagram illustrating embodiments of the Host Machine Allocating Module.

With reference to FIG. 8, a schematic block diagram of embodiments of the Host Machine Allocating Module 110 of FIG. 2 is shown.

The Host Machine Allocating Module 110 may comprise a processing module 801, such as a means for performing the methods described herein. The means may be embodied in the form of one or more hardware modules and/or one or more software modules The Host Machine Allocating Module 110 may further comprise a memory 802. The memory may comprise, such as contain or store, instructions, e.g. in the form of a computer program 803, which may comprise computer readable code units.

According to some embodiments herein, the Host Machine Allocating Module 110 and/or the processing module 801 comprises a processing circuit 804 as an exemplifying hardware module. Accordingly, the processing module 801 may be embodied in the form of, or 'realized by', the processing circuit 804. The instructions may be executable by the processing circuit 804, whereby the Host Machine Allocating Module 110 is operative to perform the methods of FIG. 5. As another example, the instructions, when executed by the Host Machine Allocating Module 110 and/or the processing circuit 804, may cause the Host Machine Allocating Module 110 to perform the method according to FIG. 5.

FIG. 8 further illustrates a carrier 805, or program carrier, which comprises the computer program 803 as described directly above.

In some embodiments, the processing module 801 comprises an Input/Output module 806, which may be exemplified by a receiving module and/or a sending module as described below when applicable.

In further embodiments, the Host Machine Allocating Module 110 and/or the processing module 801 may comprise one or more of a receiving module 810, a distributing module 820, an allocating module 830, a finding module 840, a estimating module 850, and an organizing module 860 as exemplifying hardware modules. In other examples, one or more of the aforementioned exemplifying hardware modules may be implemented as one or more software modules.

Accordingly, the Host Machine Allocating Module 110 is configured for allocating a host machine 151, 152, 153 in a hardware system 100.

As mentioned, the hardware system 100 comprises a memory pool 105, 106, 107, comprising memory units, and a CPU pool 102, 103, 104, comprising CPUs, wherein the Host Machine Allocating Module 110 is configured for managing information about latency ratings for pairs of groups C1-C6, M1-M6 comprising CPUs and memory units, wherein each pair comprises one group C1-C6 of CPUs and one group M1-M6 of memory units, wherein said each pair is associated with a respective latency rating among the latency ratings, wherein the respective latency rating indicates latency between said one group C1-C6 of CPUs and said one group M1-M6 of memory units of said each pair.

Therefore, according to the various embodiments described above, the Host Machine Allocating Module 110 and/or the processing module 801 and/or the receiving module 810 is configured for receiving a request for allocation of the host machine 151, 152, 153, wherein the request indicates a first number of CPUs and a second number of memory units to be allocated for the host machine 151, 152, 153, wherein the request further indicates a policy for adapting the host machine 151, 152, 153 for execution of a type of process, wherein the policy defines a distribution of the first number of CPUs and the second number of memory units with respect to sets of latency ratings related to the latency ratings of the information.

The Host Machine Allocating Module 110 and/or the processing module 801 and/or the distributing module 820 is further configured for distributing, based on the distribution, the first number of CPUs and the second number of memory units into clusters of CPUs and memory units, wherein each cluster is associated with a respective one of the sets of latency ratings of the distribution.

Moreover, the Host Machine Allocating Module 110 and/or the processing module 801 and/or the allocating module 830 is configured for allocating said each cluster to at least one of said pairs of groups C1-C6, M1-M6, wherein the respective latency rating of said at least one of said pairs is found to match, according to the policy, the respective one of the sets of latency ratings for said each cluster.

In some embodiments, the Host Machine Allocating Module 110 and/or the processing module 801 and/or the finding module 840 may be configured for finding the respective latency rating of said at least one of said pairs that matches, according to the policy, the respective one of the sets of latency ratings for said each cluster.

Furthermore, the Host Machine Allocating Module 110 and/or the processing module 801 and/or the allocating module 830 may be configured for allocating said each cluster under a constraint that CPUs and memory units for the cluster are only allocated from CPUs and memory units of said at least one of said pairs which are not previously allocated to a further host machine.

Each set of the sets of latency ratings may correspond to at least two consecutive latency ratings of the latency ratings of the information. Alternatively, each set of the sets of latency ratings may correspond to only one of the latency ratings of the information.

In some embodiments, the Host Machine Allocating Module 110 and/or the processing module 801 and/or the estimating module 850 may be configured, for each CPU of the CPU pool 102, 103, 104, for estimating a first latency rating for said each CPU towards the memory pool 105, 106, 107. Moreover, the Host Machine Allocating Module 110 and/or the processing module 801 and/or the estimating module 850, or another estimating module 850 (not shown), may be configured, for each memory unit of the memory pool 105, 106, 107, for estimating a second latency rating for said each memory unit towards the CPU pool 102, 103, 104. The Host Machine Allocating Module 110 and/or the processing module 801 and/or the organizing module 860 may be configured for organizing the CPUs into a first plurality of groups C1-C6 of CPUs based on the estimated first latency rating, wherein each CPU of each group of the first plurality of groups has a first common latency rating towards the memory pool 105, 106, 107. Furthermore, the Host Machine Allocating Module 110 and/or the processing module 801 and/or the organizing module 860, or another organizing module (not shown) may be configured for organizing the memory units into a second plurality of groups M1-M6 of memory units based on the estimated second latency rating, wherein each memory unit of each group of the second plurality of groups has a second common latency rating towards the CPU pool 102, 103, 104.

Figure 9:
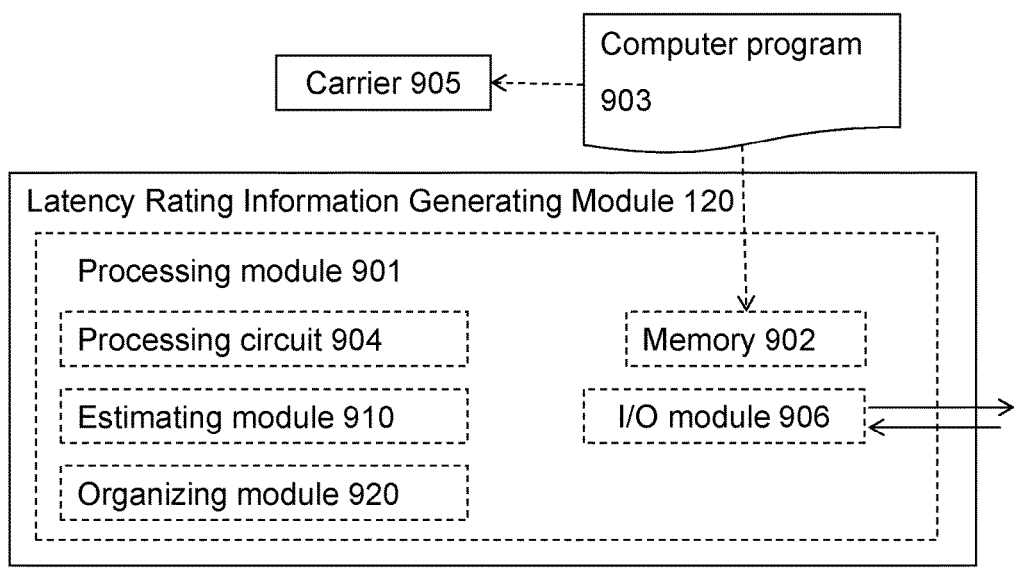
FIG. 9 is a block diagram illustrating embodiments of the Latency Rating Information Generating Module.

With reference to FIG. 9, a schematic block diagram of embodiments of the Latency Rating Information Generating Module 120 of FIG. 1 is shown.

The Latency Rating Information Generating Module 120 may comprise a processing module 901, such as a means for performing the methods described herein. The means may be embodied in the form of one or more hardware modules and/or one or more software modules The Latency Rating Information Generating Module 120 may further comprise a memory 902. The memory may comprise, such as contain or store, instructions, e.g. in the form of a computer program 903, which may comprise computer readable code units.

According to some embodiments herein, the Latency Rating Information Generating Module 120 and/or the processing module 901 comprises a processing circuit 904 as an exemplifying hardware module. Accordingly, the processing module 901 may be embodied in the form of, or 'realized by', the processing circuit 904. The instructions may be executable by the processing circuit 904, whereby the Latency Rating Information Generating Module 120 is operative to perform the methods of FIG. 6. As another example, the instructions, when executed by the Latency Rating Information Generating Module 120 and/or the processing circuit 904, may cause the Latency Rating Information Generating Module 120 to perform the method according to FIG. 6.

FIG. 9 further illustrates a carrier 905, or program carrier, which comprises the computer program 903 as described directly above.

In some embodiments, the processing module 901 comprises an Input/Output module 906, which may be exemplified by a receiving module and/or a sending module as described below when applicable.

In further embodiments, the Latency Rating Information Generating Module 120 and/or the processing module 901 may comprise one or more of an estimating module 910, and an organizing module 920 as exemplifying hardware modules. In other examples, one or more of the aforementioned exemplifying hardware modules may be implemented as one or more software modules.

Accordingly, the Latency Rating Information Generating Module 120 is configured for generating information about latency rating for use in a hardware system 100, wherein the hardware system 100 comprises a memory pool 105, 106, 107, comprising memory units, and a CPU pool 102, 103, 104, comprising CPUs.

Therefore, according to the various embodiments described above, the Latency Rating Information Generating Module 120 and/or the processing module 901 and/or the estimating module 910 is configured for estimating, for each CPU of the CPU pool 102, 103, 104, a first latency rating for said each CPU towards the memory pool 105, 106, 107.

The Latency Rating Information Generating Module 120 and/or the processing module 901 and/or the estimating module 910, or another estimating module (not shown), is further configured for estimating, for each memory unit of the memory pool 105, 106, 107, a second latency rating for said each memory unit towards the CPU pool 102, 103, 104.

Moreover, the Latency Rating Information Generating Module 120 and/or the processing module 901 and/or the organizing module 920 is configured for organizing the CPUs into a first plurality of groups C1-C6 of CPUs based on the estimated first latency rating, wherein each CPU of each group of the first plurality of groups has a first common latency rating towards the memory pool 105, 106, 107.

Additionally, the Latency Rating Information Generating Module 120 and/or the processing module 901 and/or the organizing module 920, or another organizing module (not shown), is configured for organizing the memory units into a second plurality of groups M1-M6 of memory units based on the estimated second latency rating, wherein each memory unit of each group of the second plurality of groups has a second common latency rating towards the CPU pool 102, 103, 104.

Figure 10:
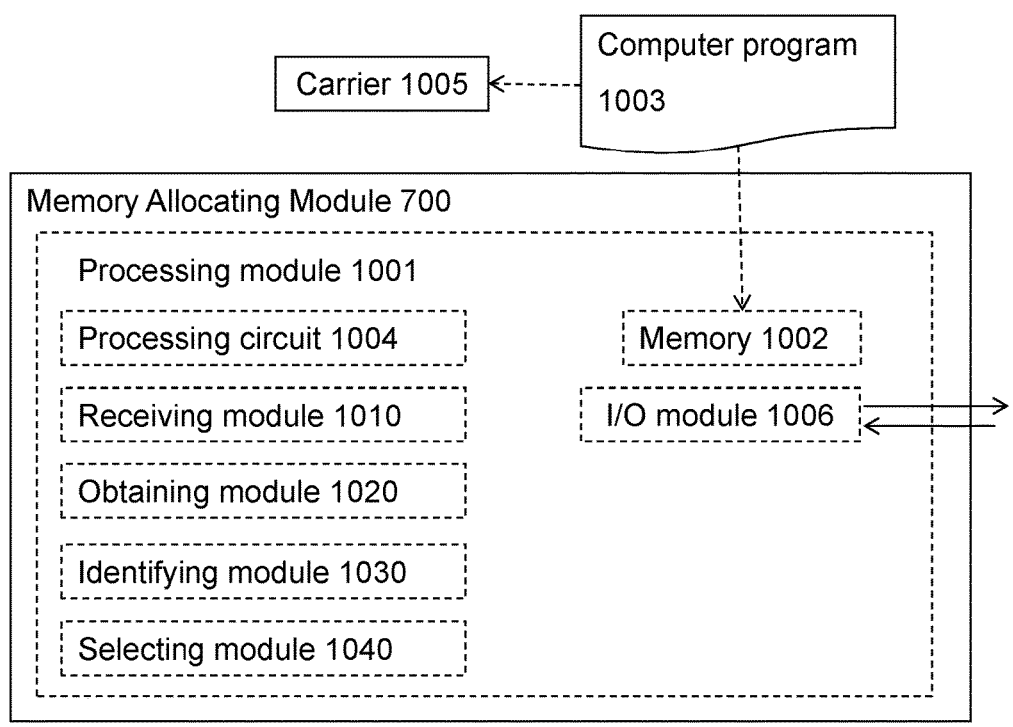
FIG. 10 is a block diagram illustrating embodiments of a Memory Allocating Module.

Furthermore, now with reference to FIG. 10, a schematic block diagram of embodiments of the Memory Allocating Module 700 mentioned in conjunction with FIG. 7 is shown. The Memory Allocating Module 700 may be depicted similarly to the HMAM 110 in FIG. 2.

The Memory Allocating Module 700 may comprise a processing module 1001, such as a means for performing the methods described herein. The means may be embodied in the form of one or more hardware modules and/or one or more software modules The Memory Allocating Module 700 may further comprise a memory 1002. The memory may comprise, such as contain or store, instructions, e.g. in the form of a computer program 1003, which may comprise computer readable code units.

According to some embodiments herein, the Memory Allocating Module 700 and/or the processing module 1001 comprises a processing circuit 1004 as an exemplifying hardware module. Accordingly, the processing module 1001 may be embodied in the form of, or 'realized by', the processing circuit 1004. The instructions may be executable by the processing circuit 1004, whereby the Memory Allocating Module 700 is operative to perform the methods of FIG. 7. As another example, the instructions, when executed by the Memory Allocating Module 700 and/or the processing circuit 1004, may cause the Memory Allocating Module 700 to perform the method according to FIG. 7.

FIG. 10 further illustrates a carrier 1005, or program carrier, which comprises the computer program 1003 as described directly above.

In some embodiments, the processing module 1001 comprises an Input/Output module 1006, which may be exemplified by a receiving module and/or a sending module as described below when applicable.

In further embodiments, the Memory Allocating Module 700 and/or the processing module 1001 may comprise one or more of an estimating module 1010, and an organizing module 1020 as exemplifying hardware modules. In other examples, one or more of the aforementioned exemplifying hardware modules may be implemented as one or more software modules.

Accordingly, the Memory Allocating Module 700 is configured for allocating memory for, e.g. to be used by, a process to be executed on a host machine.

Therefore, according to the various embodiments described above, the Memory Allocating Module 700 and/or the processing module 1001 and/or the receiving module 1010 may be configured for receiving a memory allocation request. Each module has access to the information about the latency ratings between CPUs and memory units of the host machine, i.e. those CPUs and memory units that the operating system manages. The information may have been obtained by inspecting the host machine, e.g. reading of ports of the host machine, reading of configuration parameters—similarly to specific device information, probing or the like.

Moreover, the Memory Allocating Module 700 and/or the processing module 1001 and/or the obtaining module 1020 may be configured for obtaining a required latency, or required latency rating, for the process. A programmer, a system administrator, or the like may provide the required latency, e.g. if the programmer has provided the required latency it may be that the process upon initialization sends a required latency request to the operating system. The required latency request indicates the required latency to the operating system. If no required latency is obtained a default value for the required latency may be selected and used. As given by the information about latency ratings, the operating system may have varying latency rating towards different memory units.

Furthermore, the Memory Allocating Module 700 and/or the processing module 1001 and/or the identifying module 1030 may be configured for identifying which pair of CPU/memory groups fulfills the required latency. Should no pair of CPU/memory group fulfill the required latency, the memory allocation request will be denied. This may happen when all pairs that fulfill the required latency already have been allocated to other processes managed by the operating system.

The Memory Allocating Module 700 may also be configured for searching for pairs of CPU/memory groups for which latency rating corresponds to the required latency or better. Better latency rating means less than, or shorter than, the required latency.

In some embodiments, the Memory Allocating Module 700 may be configured for handling, have access to, a table including pairs of CPU/memory groups and their associated latency rating. In this manner, identification of the pair fulfilling the required latency is made efficient in that the method of FIG. 7 may be performed during a deterministic and/or predictable time period.

In some embodiments, the Memory Allocating Module 700 and/or the processing module 1001 and/or the selecting module 1020 may be configured for selecting, or allocating, the identified pair of CPU/memory group to the process causing the memory allocating request. Thus, the process is loaded into the CPU(s) and memory unit(s) of the identified pair of CPU/memory group.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a Host Machine Allocating Module, for allocating a host machine in a hardware system, wherein the hardware system comprises a memory pool, comprising memory units, and a CPU pool, comprising CPUs, wherein the Host Machine Allocating module is configured for managing information about latency ratings for pairs of groups comprising CPUs and memory units, wherein each pair comprises one group of CPUs and one group of memory units, wherein said each pair is associated with a respective latency rating among the latency ratings, wherein the respective latency rating indicates latency between said one group of CPUs and said one group of memory units of said each pair, wherein the method comprises:

receiving a request for allocation of the host machine, wherein the request indicates a first number of CPUs and a second number of memory units to be allocated for the host machine, wherein the request further indicates a policy for adapting the host machine for execution of a type of process, wherein the policy defines a distribution of the first number of CPUs and the second number of memory units with respect to sets of latency ratings related the latency ratings of the information, distributing, based on the distribution, the first number of CPUs and the second number of memory units into clusters of CPUs and memory units, wherein each cluster is associated with a respective one of the sets of latency ratings of the distribution, and allocating said each cluster to at least one of said pairs of groups, wherein the respective latency rating of said at least one of said pairs is found to match, according to the policy, the respective one of the sets of latency ratings for said each cluster.

2. The method according to claim 1, wherein the method comprises:

finding the respective latency rating of said at least one of said pairs that matches, according to the policy, the respective one of the sets of latency ratings for said each cluster.

3. The method according to claim 1, wherein the allocating of said each cluster is performed under a constraint that CPUs and memory units for the cluster are only allocated from CPUs and memory units of said at least one of said pairs which are not previously allocated to a further host machine.

4. The method according to claim 1, wherein each set of the sets of latency ratings corresponds to at least two consecutive latency ratings of the latency ratings of the information.

5. The method according to claim 1, wherein each set of the sets of latency ratings corresponds to only one of the latency ratings of the information.

6. The method according to claim 1, wherein the method comprises:
for each CPU of the CPU pool, estimating a first latency rating for said each CPU towards the memory pool,
for each memory unit of the memory pool, estimating a second latency rating for said each memory unit towards the CPU pool,
organizing the CPUs into a first plurality of groups of CPUs based on the estimated first latency rating, wherein each CPU of each group of the first plurality of groups has a first common latency rating towards the memory pool, and
organizing the memory units into a second plurality of groups of memory units based on the estimated second latency rating, wherein each memory unit of each group of the second plurality of groups has a second common latency rating towards the CPU pool.

7. A Host Machine Allocating Module configured for allocating a host machine in a hardware system, wherein the hardware system comprises a memory pool, comprising memory units, and a CPU pool, comprising CPUs, wherein the Host Machine Allocating Module is configured for managing information about latency ratings for pairs of groups comprising CPUs and memory units, wherein each pair comprises one group of CPUs and one group of memory units, wherein said each pair is associated with a respective latency rating among the latency ratings, wherein the respective latency rating indicates latency between said one group of CPUs and said one group of memory units of said each pair, wherein the Host Machine Allocating Module comprises a processor configured for:
receiving a request for allocation of the host machine, wherein the request indicates a first number of CPUs and a second number of memory units to be allocated for the host machine, wherein the request further indicates a policy for adapting the host machine for execution of a type of process, wherein the policy defines a distribution of the first number of CPUs and the second number of memory units with respect to sets of latency ratings related the latency ratings of the information,
distributing, based on the distribution, the first number of CPUs and the second number of memory units into clusters of CPUs and memory units, wherein each cluster is associated with a respective one of the sets of latency ratings of the distribution, and
allocating said each cluster to at least one of said pairs of groups, wherein the respective latency rating of said at least one of said pairs is found to match, according to the policy, the respective one of the sets of latency ratings for said each cluster.

8. The Host Machine Allocating Module according to claim 7, wherein the Host Machine Allocating Module processor is further configured for finding the respective latency rating of said at least one of said pairs that matches, according to the policy, the respective one of the sets of latency ratings for said each cluster.

9. The Host Machine Allocating Module according to claim 7, wherein the allocating of said each cluster is performed under a constraint that CPUs and memory units for the cluster are only allocated from CPUs and memory units of said at least one of said pairs which are not previously allocated to a further host machine.

10. The Host Machine Allocating Module according to claim 7, wherein each set of the sets of latency ratings corresponds to at least two consecutive latency ratings of the latency ratings of the information.

11. The Host Machine Allocating Module according to claim 7, wherein each set of the sets of latency ratings corresponds to only one of the latency ratings of the information.

12. The Host Machine Allocating Module according to claim 7, wherein the Host Machine Allocating Module processor is further configured for:
for each CPU of the CPU pool, estimating a first latency rating for said each CPU towards the memory pool,
for each memory unit of the memory pool, estimating a second latency rating for said each memory unit towards the CPU pool,
organizing the CPUs into a first plurality of groups of CPUs based on the estimated first latency rating, wherein each CPU of each group of the first plurality of groups has a first common latency rating towards the memory pool, and
organizing the memory units into a second plurality of groups of memory units based on the estimated second latency rating, wherein each memory unit of each group of the second plurality of groups has a second common latency rating towards the CPU pool.

13. A system comprising:
a non-transitory memory; and
a processing circuit to execute instructions stored on the non-transitory memory to perform operations comprising:
managing information about latency ratings for pairs of groups comprising CPUs and memory units, wherein each pair comprises one group of CPUs and one group of memory units, wherein said each pair is associated with a respective latency rating among the latency ratings, wherein the respective latency rating indicates latency between said one group of CPUs and said one group of memory units of said each pair;
receiving a request for allocation of a host machine, wherein the request indicates a first number of CPUs and a second number of memory units to be allocated for the host machine, wherein the request further indicates a policy for adapting the host machine for execution of a type of process, wherein the policy defines a distribution of the first number of CPUs and the second number of memory units with respect to sets of latency ratings related the latency ratings of the information;
distributing, based on the distribution, the first number of CPUs and the second number of memory units into clusters of CPUs and memory units, wherein each cluster is associated with a respective one of the sets of latency ratings of the distribution; and allocating said each cluster to at least one of said pairs of groups, wherein the respective latency rating of said at least one of said pairs is found to match, according to the policy, the respective one of the sets of latency ratings for said each cluster.

14. A non-transitory memory having stored thereon computer-readable instructions executable to cause a machine to perform operations comprising:

managing information about latency ratings for pairs of groups comprising CPUs and memory units, wherein each pair comprises one group of CPUs and one group of memory units, wherein said each pair is associated with a respective latency rating among the latency ratings, wherein the respective latency rating indicates latency between said one group of CPUs and said one group of memory units of said each pair;

receiving a request for allocation of a host machine, wherein the request indicates a first number of CPUs and a second number of memory units to be allocated for the host machine, wherein the request further indicates a policy for adapting the host machine for execution of a type of process, wherein the policy defines a distribution of the first number of CPUs and the second number of memory units with respect to sets of latency ratings related the latency ratings of the information;

distributing, based on the distribution, the first number of CPUs and the second number of memory units into clusters of CPUs and memory units, wherein each cluster is associated with a respective one of the sets of latency ratings of the distribution; and allocating said each cluster to at least one of said pairs of groups, wherein the respective latency rating of said at least one of said pairs is found to match, according to the policy, the respective one of the sets of latency ratings for said each cluster.

* * * * *